United States Patent [19]

Zwahlen et al.

[11] 4,093,584

[45] June 6, 1978

[54] PROCESS FOR THE MASS COLORATION OR WHITENING OF LINEAR POLYESTERS

[75] Inventors: Günther Zwahlen, Dornach; Gerhard Umsonst, Frenkendorf; Andreas Laely, Allschwil, all of Switzerland

[73] Assignee: Ciba-Geigy Corporation, Ardsley, N.Y.

[21] Appl. No.: 639,559

[22] Filed: Dec. 10, 1975

[30] Foreign Application Priority Data

Dec. 18, 1974 Switzerland .................... 16889/74

[51] Int. Cl.² ............................................. C08K 9/04
[52] U.S. Cl. .............................. 260/40 P; 260/42.21; 260/873
[58] Field of Search .................. 260/40 P, 873, 42.2

[56] References Cited

U.S. PATENT DOCUMENTS

| | | | |
|---|---|---|---|
| 2,380,126 | 7/1945 | Sturm | 260/873 |
| 2,571,319 | 10/1951 | Waters et al. | 260/40 P |
| 3,133,893 | 5/1964 | Newman | 260/42.21 |
| 3,322,854 | 5/1967 | Yasui et al. | 260/873 |
| 3,359,344 | 12/1967 | Fukushima | 260/873 |
| 3,642,686 | 2/1972 | Zwahlen et al. | 260/40 P X |
| 3,694,402 | 9/1972 | Essam | 260/40 P X |

FOREIGN PATENT DOCUMENTS 533,660   3/1973   Switzerland ................ 260/40 P

*Primary Examiner*—Sandra M. Person
*Attorney, Agent, or Firm*—Vincent J. Cavalieri

[57] ABSTRACT

A process for the mass coloration or whitening of linear polyesters, wherein the polyester to be colored is mixed, in the solid or fused state, with a preparation consisting substantially of a colorant or fluorescent brightener which is soluble or insoluble in the polyester, and of a polystyrene with a softening point above 100° C, and the resultant mixture, provided it is not already in the form of a melt, is converted into the molten state and formed into shaped articles. Evenly and deeply colored polyesters are obtained.

6 Claims, No Drawings

PROCESS FOR THE MASS COLORATION OR WHITENING OF LINEAR POLYESTERS

It is known that preparations which, in addition to the colourant, contain a carrier, are used with advantage for colouring thermplastic polymers in the melt. Various carriers have already been used for colouring linear polyesters in the melt, for example magnesium behenate, ethyl hydroxyethyl cellulose, polyolefins, or low molecular polystyrene resins with softening points below 100° C. However, these carriers have in general not proved successful, whether because of insufficient compatibility or heat resistance.

It has now been found that linear polyesters can be mass coloured or whitened without the disadvantages referred to above by mixing the polyester to be coloured, in the solid or fused state, with a preparation consisting substantially of a colourant or fluorescent brightener which is soluble or insoluble in the polyester and a polystyrene of high molecular weight with a softening point about 100° C, converting the resultant mixture into the molten state, providing it is not already in the form of a melt, and forming it into shaped articles.

The preparations to be used according to the present invention contain preferably 10–70%, in particular 40–60%, of colourant or fluorescent brightener.

The polystyrene used has a softening point of over 100° C. The softening point is that temperature at which a sample of substance adheres firmly to a Kofler heating bench.

The colourants or fluorescent brighteners on which the preparations are based can be soluble or insoluble in the linear polyester.

Suitable polymer-soluble colourants are preferably:

(a) disperse dyes, in particular those of the anthraquinone series, for example hydroxyanthraquinones, aminoanthraquinones, alkylaminoanthraquinones, cyclohexylaminoanthraquinones, arylaminoanthraquinones or hydroxyaminoanthraquinones, phenylmercaptoanthraquinones, (b) metal complexes of azo dyes, in particular 1:2 chromium or cobalt complexes of monoazo dyes.

Examples of such colourants are the 1:2-chromium complexes of the o,o'-dihydroxymonoazo dyes disclosed in Swiss patent 508.005, the arylaminoanthraquinones disclosed in French patent application 2.081.678, the aminohydroxyanthraquinones disclosed in French patent application 2.081.688, the 1,4-diphenylamino-5,8-dihydroxyanthraquinones disclosed in German Offenlegungsschrift No. 2.021.768, the cyclohexylamino- and toluidinoanthraquinones disclosed in U.S. Pat. No. 3.478.041, the reaction products of aminoanthraquinone with monohaloarylketones described in German Auslegeschrift No. 1.128.066 or the phenylmercaptoanthraquinones described in German Auslegeschrift No. 1.283.933.

The polymer-insoluble colourants (pigments) can also belong to the most widely different chemical classes, provided they meet the high requirements in respect of resistance in the processing conditions of polyester. Organic pigments are preferred, for example azo, azomethine, anthraquinone, phthalocyanine, nitro, perinone, perylenetetracarboxylic acid diimide, dioxazine, thioindogo, iminoisoindolinone or quinacridone pigments. Metal complexes, for example of azo, azomethine or methine dyes of pigment character, are also suitable.

It is also possible to use mixtures of different colourants or fluorescent brighteners or mixtures of polymer-soluble and polymer-insoluble colourants.

The preparations of the present invention can be obtained by the most diverse processes. They are obtained at all events by intimately mixing the components, whether dry, wet or in the melt. For example, they are obtained by mixing or grinding in the presence of a liquid, advantageously water or an organic solvent which does not dissolve the colourant.

Conventional ball or roll mills can be used, as desired. However, it is advantageous to use mills in which a charge of glass balls, porcelain or similar balls, or a charge of hard pebbles or the like, can be set in motion by means of a suitable stirrer. A feature common to such kinds of comminution devices is that the grinding bodies are relatively freely movable and are capable of executing both frictional and impact movements.

After termination of the grinding process, the solvent is removed, the method chosen depending on the solubility of the carrier used. If the carrier is soluble in the solvent it is advantageously precipitated on the colourant before the solvent is removed.

The preparations of this invention may also be manufactured in a kneader. Processing is preferably carried out at an elevated temperature in the presence of a grinding assistant, advantageously of an inorganic salt, for instance sodium chloride, potassium chloride, sodium sulphate or barium chloride. These salts are easy to wash out again with water. Moreover, it is advantageous in certain cases to use an organic solvent, preferably a water-miscible organic solvent, in which the colourant employed may not be soluble. On completion of the kneading operation the dough is advantageously treated with water to free it from salts and solvents.

In a preferred embodiment, the preparations according to the invention are manufactured by processing the dry, as a rule powdery homogeneous mixture of dyestuff and carrier, which also optionally contains additional assistants, in a continuously operating kneader or an extruder in the melt, to granulates.

Another process is, for example, to mix the colourant wet with polystyrene powders, preferably in the form of polystyrene dispersions, then to process the mixture to a dry powder and subsequently to remelt it to granulates.

Suitable polyesters to be coloured are in particularly those that are obtained by polycondensation of terephthalic acid or esters thereof with glycols of formula HO—$(CH_2)_n$—OH, wherein $n$ is an integer from 2 to 10 or with 1,4-di(hydroxymethyl)-cyclohexane, or by polycondensation of glycol ethers of hydroxybenzoic acids, for example p($\beta$-hydroxyethoxy)-benzoic acid. The term "linear polyesters" also comprises copolyesters which are obtained by partial replacement of terephthalic acid by another dicarboxylic acid or a hydroxycarboxylic acid and/or by partial replacement of glycol by another diol. Of particular interest, however, are the polyethyleneterephthalates.

The polyesters to be coloured are advantageously mixed with the preparation in the form of powders, chips or granules. This is effected, for example, by sprinkling the polyester particles with the finely divided preparation, with or without adhesive agents, or by the hot coating according to German Offenlegungsschrift No. 2.312.260, or by mixing the preparation granulate with the polyester granulate, or by melting the preparation granulate in an injection extruder and injecting it into the polyester melt. Depending on the desired colour strength, the ratio of preparation to polyester can vary within wide limits. In general, it is advisable to use 0.01 to 10 parts, in particular 0.1 to 5 parts, of preparation to 100 parts of polyester.

The polyester particles mixed with the preparation are melted in an extruder by known methods and pressed out to shaped articles, especially sheets or fibres, or cast to form boards.

The objects obtained are evenly and deeply coloured and have good fastness to light. The coloured fibres obtained according to the process of the invention meet the requirements made of the wetfastness and dry cleaning fastness properties.

The coloured articles contain advantageously 0.01 to 5% of colourant or fluorescent brightener and 0.01 to 10% of polystyrene.

In the following Examples which illustrate the invention, the parts and percentages are by weight unless otherwise indicated.

EXAMPLE 1

120 parts of standard polystyrene (Vestyron 114-31; Chem. Werke Huls) in powder form (obtained by dissolving 1000 parts of polystyrene granulate in 900 parts of methyl ethyl ketone, precipitation with water, filtering and drying) are mixed for 3 hours in a mixing drum on a roller gear bed with 80 parts of the blue copper phthalocyanine-tetramethoxypropylsulphonamide which is soluble in the polyester melt. The powder mixture is subsequently fused in an extruder and formed to cords of 3 mm diameter which are cut on a cutting machine to cylindrical chips 3 mm in length. This granulate, consisting of 40% of colourant and 60% of polystyrene, is highly suitable for the mass colouration of polyester fibres, both by mixing the preparation granulate with the polyester granulate and by fusing the preparation granulate in an extruder and injecting it into the polyester melt.

EXAMPLE 2

100 parts of standard polystyrene (PS 165 H: BASF) are dissolved at 135° C in 900 parts of γ-butyrolactone. After the solution has cooled, 100 parts of the yellow colourant of formula

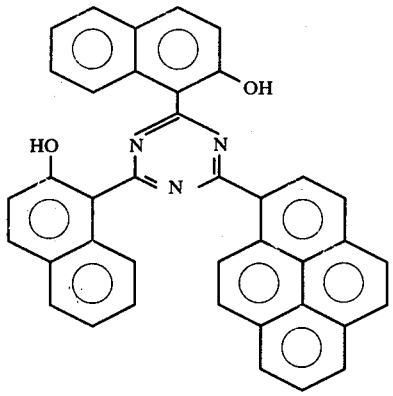

which is soluble in the polyester melt, are dispersed in the polystyrene solution. The pigmented solution is poured into 2000 parts of water while stirring vigorously with a toothed disc, and the polystyrene precipitates together with the colourant in fine granular form. The resultant suspension is filtered and washed free of solvent with water. The filter cake is dried in a vacuum tube at 65° C. The irregular granulate, consisting of 50% of colourant and 50% of polystyrene, can be used direct for the mass colouration of polyester fibres. It is advantageous, however, to remelt the granulate in an extruder or some other continuous kneader to give cylindrical chips.

EXAMPLE 3

3 kg of standard polystyrene granulate (PS 165 H: BASF), 3 kg of the yellow colourant of Example 2 and 1.5 kg of γ-butyrolactone are kneaded for 1½ to 2 hours at a kneading compound temperature of app. 90° C in a divided trough kneader. The kneading compound is reduced and granulated by addition of 1.5 kg of water. The moist granulate, which was obtained from two such batches, is suspended in app. 200 liters of water and ground wet to give a product in the form of a coarser powder. The ground suspension is filtered, washed free of solvent with water, and the filter cake is dried at 80° C in a vacuum cabinet.

The granular, free-flowing product can be used direct for the mass colouration of polyester fibres, but is advantageously remelted beforehand to a granulate, for example as follows: 15 kg of the above preparation are extruded at temperatures between 120° and 160° C in a laboratory Ko-kneader, system List (type PR/ASV 46, BUSS) and chopped hot to give granules with a granular size of 2-4 mm. This granulate consisting of 50% colourant and 50% of polystyrene, is highly suitable for spin colouration.

EXAMPLE 4

150 parts of standard polystyrene (PS 165 H, BASF), 100 parts of the red pigment of formula

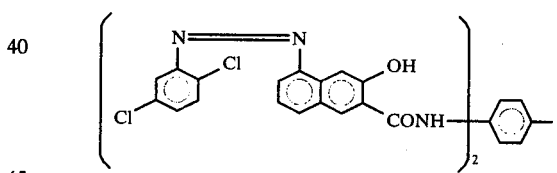

500 parts of finely ground common salt and 100 parts of dimethyl formamide are kneaded in a laboratory kneader for 6 hours at 60°-65° C. The kneading compounds is reduced and granulated by adding 100 parts of water. The course-grained granulate is suspended in app. 5000 parts of water and subjected to a wet grinding in a tooth colloid mill to give fine granules. The ground suspension is filtered and the filter cake is washed free of solvent and salt with water and dried in a vacuum cabinet at 80° C. A free-flowing powder is obtained which consists of 40% of pigment and 60% of polystyrene and which can be used as obtained for the mass colouration of polyester fibres. Advantageously, however, the product is remelted in an extruder or a Ko-kneader to give a granulate.

EXAMPLE 5

The procedure of Example 4 is repeated using a green polychloro-copper phthalocyanine pigment instead of the red disazo pigment, to give a green preparation which is very suitable for the mass colouration of polyester fibres.

EXAMPLE 6

The following ingredients are kneaded for 6 hours at 75°–80° C in a laboratory kneader: 150 parts of standard polystyrene granulate (PS 165 H: BASF), 100 parts of crude β-copper phthalocyanine blue, 500 parts of finely ground common salt and 100 parts of γ-butyrolactone. The mixture is processed to a powder or granulate analogously to Example 4 to yield a blue preparation, consisting of 40% of pigment and 60% of polystyrene, which is very suitable for the mass colouration of polyester fibres.

EXAMPLE 7

By proceeding as in Example 6, but using a carbon black, for example Printex 300 (DEGUSSA), instead of the copper phthalocyanine, a black preparation which is very suitable for the mass colouration of polyester fibres is obtained.

EXAMPLE 8

400 g of a polyethylene terephthalate in granulate form are mixed with 10 g of a granulate obtained in the previous Examples by shaking in a closed vessel or on a roller gear bed. The resultant mixture of uncoloured polyester granulate and preparation granulate is dried for app. 48 hours at 100° C and app. 0.5 Torr and then spun to polyester endless primary filaments in an extruder melt spinning device (type Inventa) at 290° C spinning temperature and a dwell time of app. 10 minutes and with a take-off of 300 m/mins. using a nozzle (24 hole, 0.35 mm diameter). These filaments are then stretched in a draw twister at 100° C godet temperature in the ratio 1:4.022. The fibre properties are substantially the same as those of uncoloured fibres.

We claim:

1. A process for the mass colouration or whitening of linear polyesters, wherein the polyester to be coloured is mixed, in the solid or fused state, with a preparation consisting substantially of a colourant or fluorescent brightener which is soluble or insoluble in the polyester, and of a polystyrene with a softening point above 100° C, and the resultant mixture, provided it is not already in the form of a melt, is converted into the molten state and formed into shaped articles.

2. A process according to claim 1, wherein the preparations contain organic pigments as colourants which are insoluble in the polyester.

3. A process according to claim 1, wherein the preparations contain 10–70% of colourant or fluorescent brightener.

4. A process according to claim 3, wherein the preparations contain 40–60% of colourant or fluorescent brightener.

5. Linear polyesters according to claim 1 which contain 0.01 to 5% of a colourant or fluorescent brightener that is soluble or insoluble in the polyester and 0.01 to 10% of a polystyrene with a softening point of over 100° C.

6. Linear polyesters according to claim 5 which contain an organic pigment as colourant.